United States Patent
Baillie et al.

(10) Patent No.: US 7,507,352 B2
(45) Date of Patent: Mar. 24, 2009

(54) LUMINOUS MATERIALS

(76) Inventors: Craig Jameson Baillie, 9 Tynewydd Drive, Castleton, Cardiff CF3 2SB (GB); Stephen Lambert, Ocle Pychard, Hereford, HR1 3RF (GB)

(*) Notice: Subject to any disclaimer, the term of this patent is extended or adjusted under 35 U.S.C. 154(b) by 0 days.

(21) Appl. No.: 10/297,461

(22) PCT Filed: Jun. 8, 2001

(86) PCT No.: PCT/GB01/02532

§ 371 (c)(1),
(2), (4) Date: Aug. 11, 2003

(87) PCT Pub. No.: WO01/94496

PCT Pub. Date: Dec. 13, 2001

(65) Prior Publication Data

US 2004/0021407 A1 Feb. 5, 2004

(51) Int. Cl.
*C09K 11/02* (2006.01)
(52) U.S. Cl. ............... 252/301.36; 252/301.33; 252/301.4 F; 252/301.6 F; 252/301.6 R; 252/301.4 R; 501/32; 439/490; 362/84; 362/95; 362/205; 200/310; 200/311; 200/312; 200/313; 200/314; 200/315; 200/316; 200/317; 428/690; 428/325; 428/141; 428/355 R
(58) Field of Classification Search ............... 439/490; 501/32; 362/84, 95, 205; 200/310–317; 428/690, 325, 355 R, 141, 143, 149; 252/301.33, 252/301.36, 301.6 F, 301.6 R, 301.4 R, 301.4 F
See application file for complete search history.

(56) References Cited

U.S. PATENT DOCUMENTS

| 3,915,884 | A | * | 10/1975 | Kazenas ................. 252/301.35 |
| 4,623,579 | A | * | 11/1986 | Quon .......................... 428/215 |
| 5,424,006 | A | * | 6/1995 | Murayama et al. .... 252/301.4 R |
| 5,490,344 | A | * | 2/1996 | Bussiere ..................... 43/17.5 |
| 5,686,022 | A | | 11/1997 | Murayama et al. |
| 5,707,437 | A | * | 1/1998 | Niedenzu et al. ............ 106/446 |
| 5,752,761 | A | * | 5/1998 | Pietruczynik et al. ......... 362/84 |
| 5,833,892 | A | * | 11/1998 | Gurav et al. .................. 264/13 |
| 5,908,498 | A | * | 6/1999 | Kauffman et al. ........... 106/437 |
| 5,976,411 | A | * | 11/1999 | Feng et al. ............. 252/301.35 |
| 5,989,135 | A | | 11/1999 | Welch |
| 6,177,029 | B1 | * | 1/2001 | Kaz et al. .............. 252/301.33 |

(Continued)

FOREIGN PATENT DOCUMENTS

GB 2250636 * 6/1992

(Continued)

OTHER PUBLICATIONS

Canadian Application No. 2,091,110 Counterpart of DE 92 02 955 U (ROHM), Sep. 7, 1993.

(Continued)

*Primary Examiner*—C. Melissa Koslow
(74) *Attorney, Agent, or Firm*—Cook Alex Ltd.

(57) ABSTRACT

A luminous material comprising a rubber, glass or plastics material matrix. A luminescent material is dispersed throughout the matrix, and a colorant dispersed throughout the matrix. The colourant gives the matrix a colour when it is observed under substantially white light, and the colourant allowing substantial transmission of light emitted by the luminous material.

56 Claims, 6 Drawing Sheets

U.S. PATENT DOCUMENTS

Figure 1A:
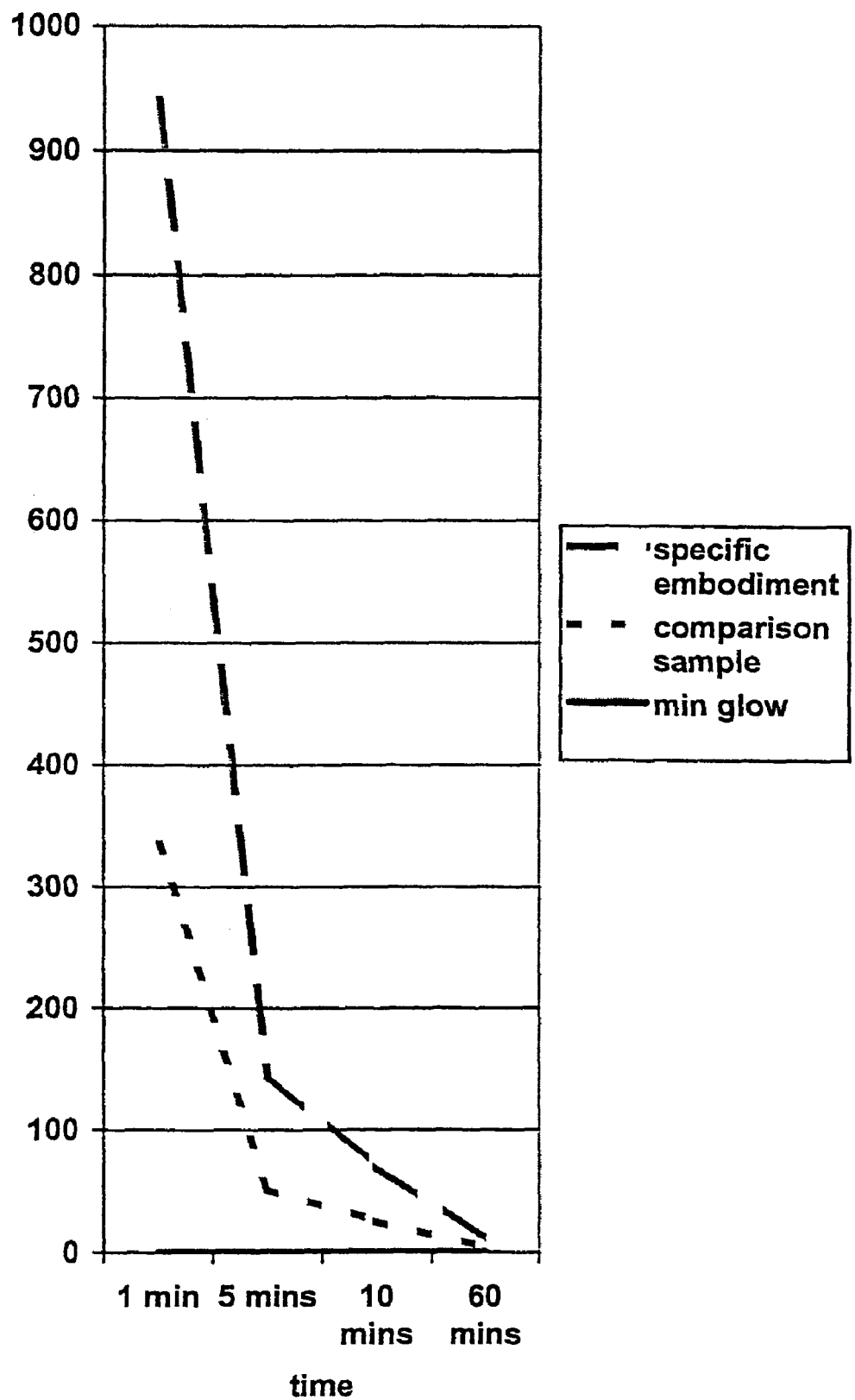

| | | | | |
|---|---|---|---|---|
| 6,207,077 B1 * | 3/2001 | Burnell-Jones | ........ | 252/301.36 |
| 6,296,911 B1 * | 10/2001 | Catarineu Guillen | ......... | 428/29 |
| 6,375,864 B1 * | 4/2002 | Phillips et al. | ......... | 252/301.33 |
| 6,569,786 B1 * | 5/2003 | Marsh | ........................ | 442/132 |
| 6,716,368 B1 * | 4/2004 | Schottland et al. | ..... | 252/301.36 |

FOREIGN PATENT DOCUMENTS

| | | | |
|---|---|---|---|
| GB | 2350231 | * | 11/2000 |
| JP | 06-345952 | * | 12/1994 |
| WO | WO 00/27908 A2 | | 5/2000 |
| WO | WO 00/27908 A3 | | 5/2000 |

OTHER PUBLICATIONS

European Patent Office Communication Re: Application 1 936 676. 4—2111 (Baillie), May 22, 2006.

English Translation of DE 92 02 955 U (ROHM) Jun. 4, 1992.

European Patent Office Communication dated Sep. 9, 2007 enclosing Observation of a Third Party dated Aug. 31, 2007 (16 pages) with following prior art attached: D3—U.S. 5,989,135; D4—U.S. 5,686,022; D5—U.S. 5,424,006; D6—Technical Sheet Chemitech Picariko; D7—Internet Excerpt "Particle Size Conversion"; D8a—WO/2000/27908 A2 and D8b—WO/2000/27908 A3.

Technical Sheet "Chemiteck Picariko", pp. 1-8, Chemitech Inc., Jan. 22, 1997.

Internet excerpt "Particle size conversion", http://www.sigmaaldrich.com/Area_of_Interest/Research_Essentials/Chemicals/Key_Resources/Technical_Library/Particle Size_Conversion.html.

* cited by examiner

LUMINOUS MATERIALS

The present invention is directed to luminous materials having improved properties.

Thermoplastic materials having luminous, or "glow-in-the-dark" characteristics are well-known. However, the materials themselves are typically of a dull, pale, green or grey colour under normal daylight condition, which can render articles made from these materials difficult to see in daylight, and also lacking in aesthetic appeal. Attempts to increase the visibility of such articles by adding colourings to the thermoplastic materials has the disadvantageous effect of decreasing the luminosity, because the colouring acts to quench the light given off by the luminescent material in the thermoplastic, thus reducing the afterglow of the material. This renders the luminosity of the article both dimmer and more short-lived compared to that of a non-coloured article.

For example flashlights with luminescent parts have been previously proposed in U.S. Pat. Nos. 3,796,869, 4,210,953, 4,546,416 and 5,757,111. U.S. Pat. No. 5,752,761 further discloses a flashlight casing containing a combination of a luminescent colorant material and a reflective colorant material.

The present invention seeks to address the aforementioned disadvantages.

Accordingly, a first aspect of the present invention is directed to a luminous material comprising a rubber, glass or plastics material matrix, a luminescent material dispersed throughout the matrix, and a colorant dispersed throughout the matrix, the colourant giving the matrix a colour when it is observed under substantially white light, and the colourant allowing substantial transmission of light emitted by the luminous material. Thus the material has both the properties of high visibility, owing to the colourant, and high luminosity, thanks to the colourant not acting to quench the glow of the luminous material. A small amount of colorant, just sufficient to provide adequate colouration of the luminous material, gives the least possible quenching whilst still performing the function of colouring.

Preferably, the luminescent material comprises a rare earth metal, such as europium or dysprosium, which is preferably in the form of a metal, oxide or an aluminate.

Advantageously, the luminescent material further comprises an alkaline earth metal, such as strontium, which is preferably in the form of a metal, oxide or an aluminate.

Advantageously, the luminescent material comprises particles having dimensions between 8 and 100 micrometres. This small particle size gives a high level of luminosity as well as allowing very thin articles to be moulded, extruded or otherwise manufactured from the material.

In a preferred embodiment, the percentage by weight of the luminescent material to the matrix is between 4% and 32.5%, advantageously between 4% and 20% and preferably between 6% and 12%.

Advantageously, the colourant comprises a fluorescent material. This gives improved visibility of the luminous material in low light conditions, as it will fluoresce any ambient radiation as well as re-emitting any radiation stored from higher light levels. Additionally, the colour spectrum of a fluorescent material compared with that of a luminous material is such that quenching of the luminescence by the colourant is greatly reduced. The luminous material is excited by light having wavelengths in the range of 520 to 525 nm, whereas the fluorescent material fluoresces in the range 340 to 360 nm; therefore these characteristics do not interfere with each other.

In a preferred embodiment, the fluorescent material comprised in the colourant is in the fluorescent yellow colour spectrum. This gives a minimum quenching effect, to that the luminosity is maximised, and a high level of daylight visibility is also provided.

Preferably, the matrix material is polyurethane, a co-polymer of styrene and butadiene, a polyolefin (particularly polypropylene or polyethylene), acrylic, ABS, polyethyleneterephthalate or polycarbonate. Advantageously, the matrix material has a high clarity. This gives improved transmission of the luminous glow through the matrix material.

In a preferred embodiment, the luminescent material constitutes at least 90% by weight of the combined weight of the luminescent material and the colourant. Preferably, luminescent material constitutes between 94% and 99% by weight of the combined weight of the luminescent material and the colourant.

Advantageously, luminescent colorant material constitutes between 94 to 96% thereof by weight of the combined weight of luminescent material and the colorant.

Advantageously, the percentage by weight of the colourant to the matrix material is between 0.2% and 1%.

Preferably, the fluorescent material comprised in the colourant is a pigment. In a preferred embodiment, the pigment is organic, and preferably the pigment is provided in a polyamide co-condensate carrier. This acts to render the pigment compatible with a rubber or plastics material matrix.

In an advantageous embodiment, the matrix material is an engineering grade polymer. Preferably the polymer has a high clarity, and preferably the polymer is one of acrylic, ABS, polycarbonate or a polyamide such as nylon or a polyamide elastomer. Engineering grade polymers give a luminous material which is more resistant to the effects of weathering, and is therefore suitable for exterior use.

In a preferred embodiment, the percentage by weight of the luminescent material to the combined weight of the luminescent material and the colourant is at least 99%, and preferably between 99.1% and 99.98%, and advantageously between 99.7% and 99.9%.

Advantageously, the percentage by weight of the colourant to the engineering grade polymer matrix is between 0.005% and 0.05%.

Preferably, the colourant used with an engineering grade polymer matrix is a dye-type colourant.

Advantageously, the colourant is substantially white. This gives a white colour to the luminous material, making it suitable for a wide range of applications, and giving high visibility in daylight.

In a preferred embodiment, the percentage by weight of the luminescent material to the combined weight of the luminescent material and the white colourant is at least 97%, and preferably between 98.2% and 99.67%.

Preferably, the percentage by weight of the white colourant to the matrix material is between 0.33% and 3%.

Advantageously, the matrix material used with the white colourant is of a high clarity and preferably is one of polyurethane, a co-polymer of styrene and butadiene, a polyolefin (particularly polyethylene or polypropylene), acrylic, ABS, polyethyleneterephthalate, a polycarbonate, or a polyamide.

Preferably, the white colourant comprises one or more of titanium dioxide, calcium carbonate, silicon dioxide and other translucent white colourants. Advantageously, the white colourant comprises a combination of titanium dioxide and silicon dioxide.

In a preferred embodiment, the luminous material further comprises an optical brightener dispersed in the matrix. This gives the advantage that both the visibility of the material in daylight, and the visibility in the dark, via the luminescence, is enhanced.

Advantageously, the optical brightener is a fluorescent blue dye.

A second aspect of the present invention is directed to a method for making a luminous material as described above, comprising the steps of:

a) compounding a colourant into a rubber, glass or plastics matrix material; and
b) compounding a luminescent material including at least one alkaline earth metal and at least one rare earth metal in the matrix material.

Alternatively, step a) and step b) are reversed.

Alternatively, the compounding steps of a) and b) are combined into a single blending step.

Preferably, the making of the luminous material is carried out using machinery adapted to reduce shearing of the material.

A third aspect of the present invention is directed to a colourant combination comprising a colourant and a luminescent material, the colourant combination being suitable for adding to a rubber, glass or plastics material matrix for the creation of a luminous material as described above.

Preferably, the colourant combination is prepared in a universal masterbatch carrier, which is advantageously ethylene-based, such as polyethylene methacrylate or polyethylene vinyl acetate. This produces a good level of dispersion of the colourant and luminous material through the matrix material.

Advantageously, the colourant combination is prepared in the carrier at up to 65% by weight.

Preferably the colourant combination is added in concentration over 10%. Advantageously the strontium crystals and the colourant particles act as fillers. This has the effect of reducing the flammability of the aforementioned thermoplastics under the electrical standards hot wire test. This is especially the case for the white compound variant, which has about 1% increased effectiveness over other colours.

In a preferred embodiment the colourant combination is compounded into the thermoplastic. This produces an even greater fire retarding result; as the absence of the ethylene carrier increases the flashpoint of the plastics.

Preferably, the colourant combination is prepared in a machine fitted with a low shear screw.

Advantageously, the colourant combination is prepared by adding the luminescent material and the colourant to the carrier when the carrier is substantially heated or melted. Shear of the material is reduced in this way.

In a preferred embodiment, the colorant combination further comprises optical brighteners.

A fourth aspect of the present invention is directed to an article made from luminous material as described above. Alternatively, a non-luminous article can be provided with a coating, or outer layer, of luminous material.

Preferably, the article is made by moulding the luminous material. The moulding may be formed by injection or co-injection, or other suitable process (such as, for example, transfer moulding or the like). Alternatively, the article is made by extruding the luminous material.

Advantageously, the article comprises a substantially reflective layer on its reverse or inner side. Preferably, the reflective layer is white. This increases both the daylight visibility and the luminosity of the article, by reflecting light back towards an observer.

In a preferred embodiment the article has applied thereto a layer containing reflective glass beads or the like, for enhanced visibility.

Advantageously, the article is an adhesive tape, film or layer. Preferably, the luminescent material constitutes not more than 65% by weight of the total of the luminescent material, the colourant and the matrix material used to make the tape.

In a preferred embodiment, the article is a switch. This provides a switch which highly visible is both daylight/white light conditions, and in the dark, such as at night or in an emergency situation or a power cut. Preferably, the switch is a light switch suitable for use in controlling an electric light. Alternatively, the switch is suitable for use as part of a computer keyboard.

Advantageously, the light switch comprises an electrical light emitting device controlled by the switch such that light is emitted when the switch is in the on position. This is advantageous in that the light emitted acts to charge the luminous material in the switch so that the luminous glow is maximised when the switch is turned off, thus rendering the switch more visible in the dark.

Preferably, the switch is water-proof. Thus it can be used on under-water equipment. Visibility under water can be poor, so a switch with increased visibility is clearly advantageous.

In a preferred embodiment, the colourant in the luminous material of the switch gives the switch a white colour. White light switches are commonly used, so a white luminous switch is likely to fit in better with existing environments.

Advantageously, the switch is made from the material retarded against fire. Preferably further materials are added to make the switch fire retardant.

Alternatively, the article is part of any of the above-mentioned switches. Preferably, the part of a switch is adapted to be fitted to a pre-existing, non-luminous, switch or its housing. In this way, an ordinary switch can be readily converted to have the desirable high visibility properties provided by the luminous material of the present invention.

Preferably, the article is a flashlight casing, or part therefor, which is a rubber or plastics moulding. The combination of the luminescent colorant material and the reflective colorant material provides enhanced visibility (and "afterglow" properties) not only in the dark but also in well-lit conditions. The casing or part thereof has a bright luminescent appearance, as well as an afterglow in the absence of light.

The casing, or part therefor, with good afterglow properties, generally has good aesthetic properties, being a bright strong fluorescent colour in daylight rather than the milky colour associated with known afterglow products. The casing or part therefor is highly visible in low light conditions, because it can fluoresce in response to both ambient radiation and "stored" radiation.

Preferably the mouldings for the casing or part thereof is shaped from a matrix comprising a rubber or plastics material (which may be thermoplastic, which is preferred, or, in some embodiments, thermoset) with colorant materials dispersed therein.

The part of the casing according to the invention may be, for example, at least part of the main body, a sheath, a closure cap, a bezel, a button, a washer or the like.

Preferably the article is an electrical plug which is made from the material retarded against fire. Advantageously further materials are added to make the switch fire retardant.

Figure 1B:
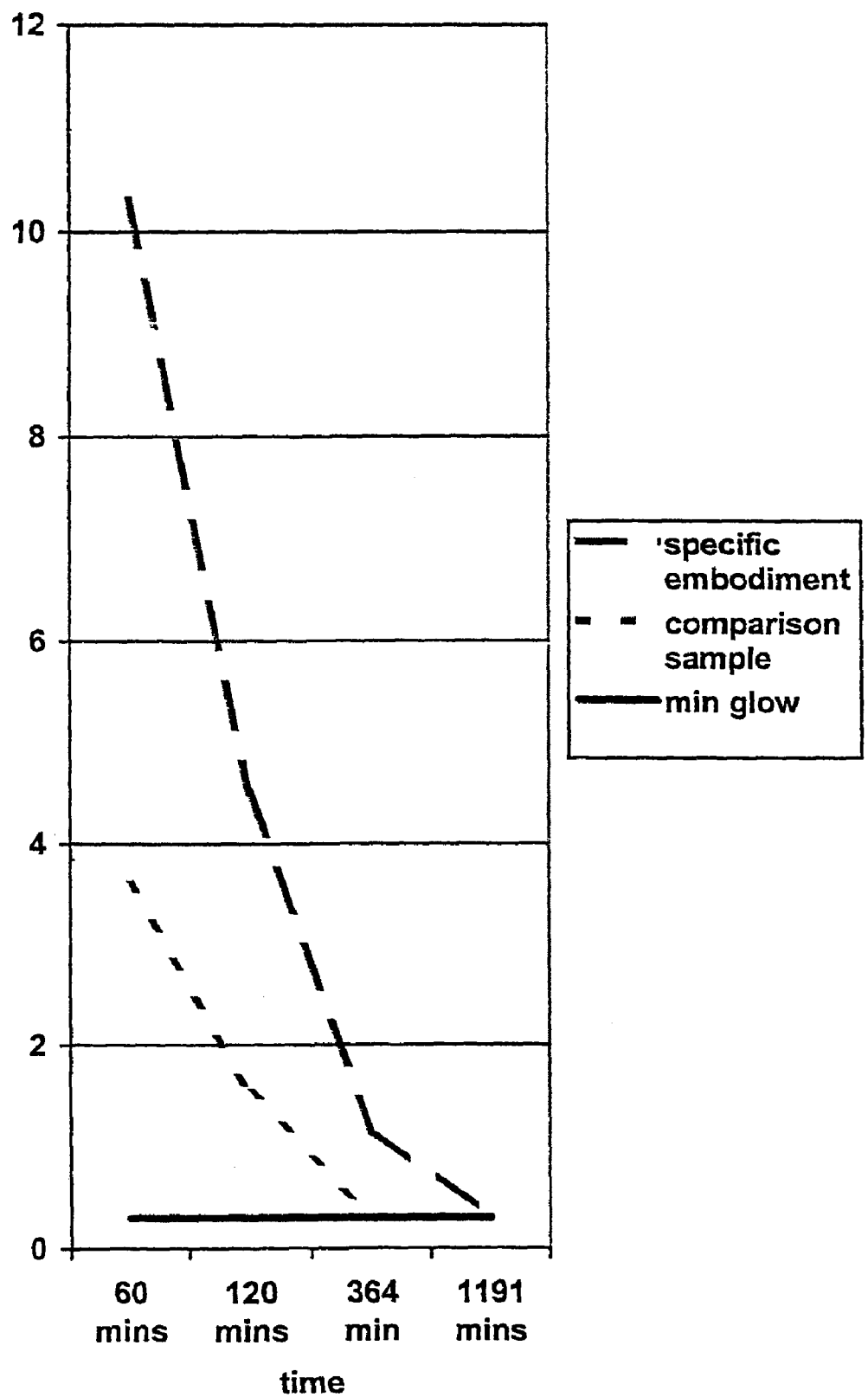
Figure 2A:
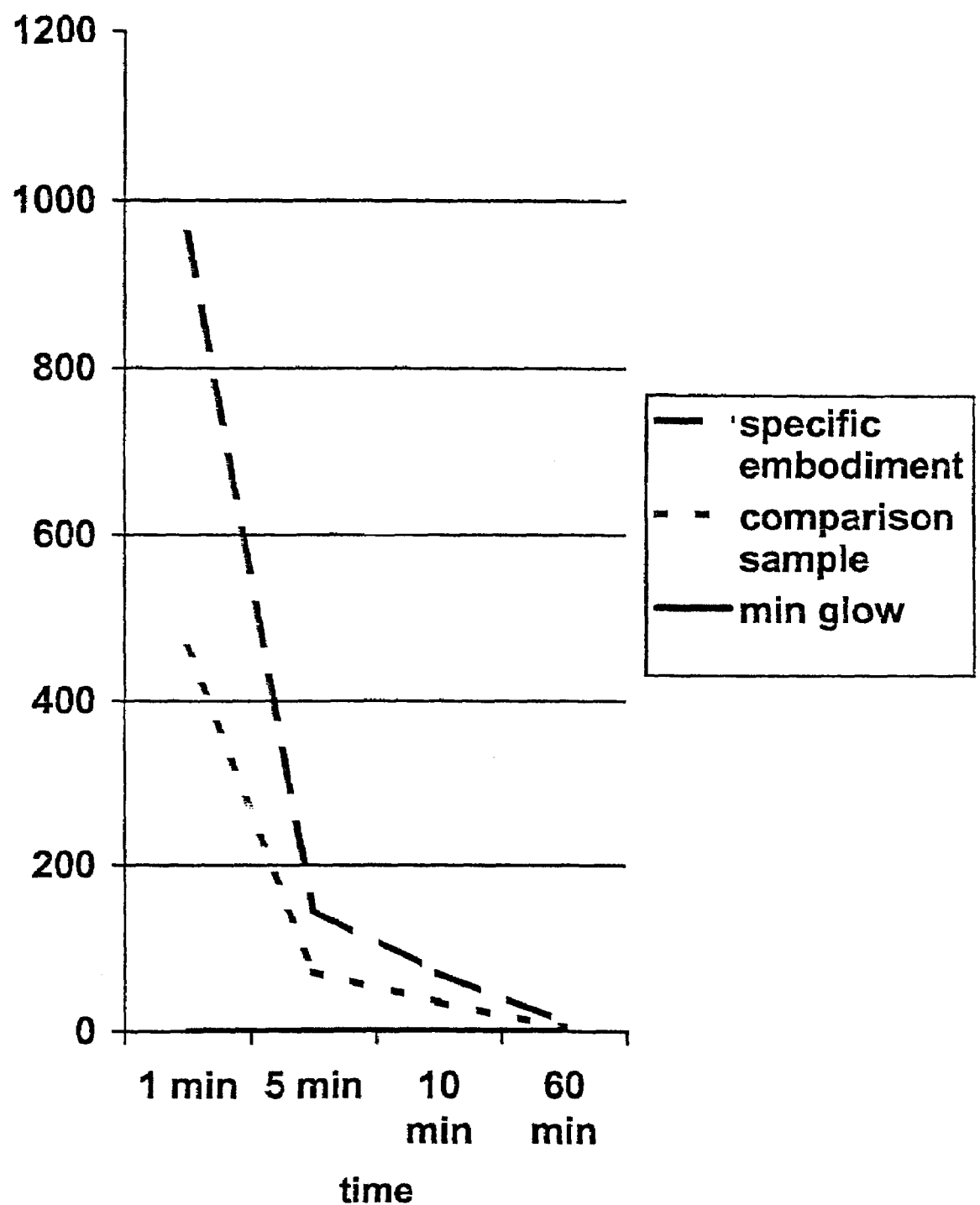
Figure 2B:
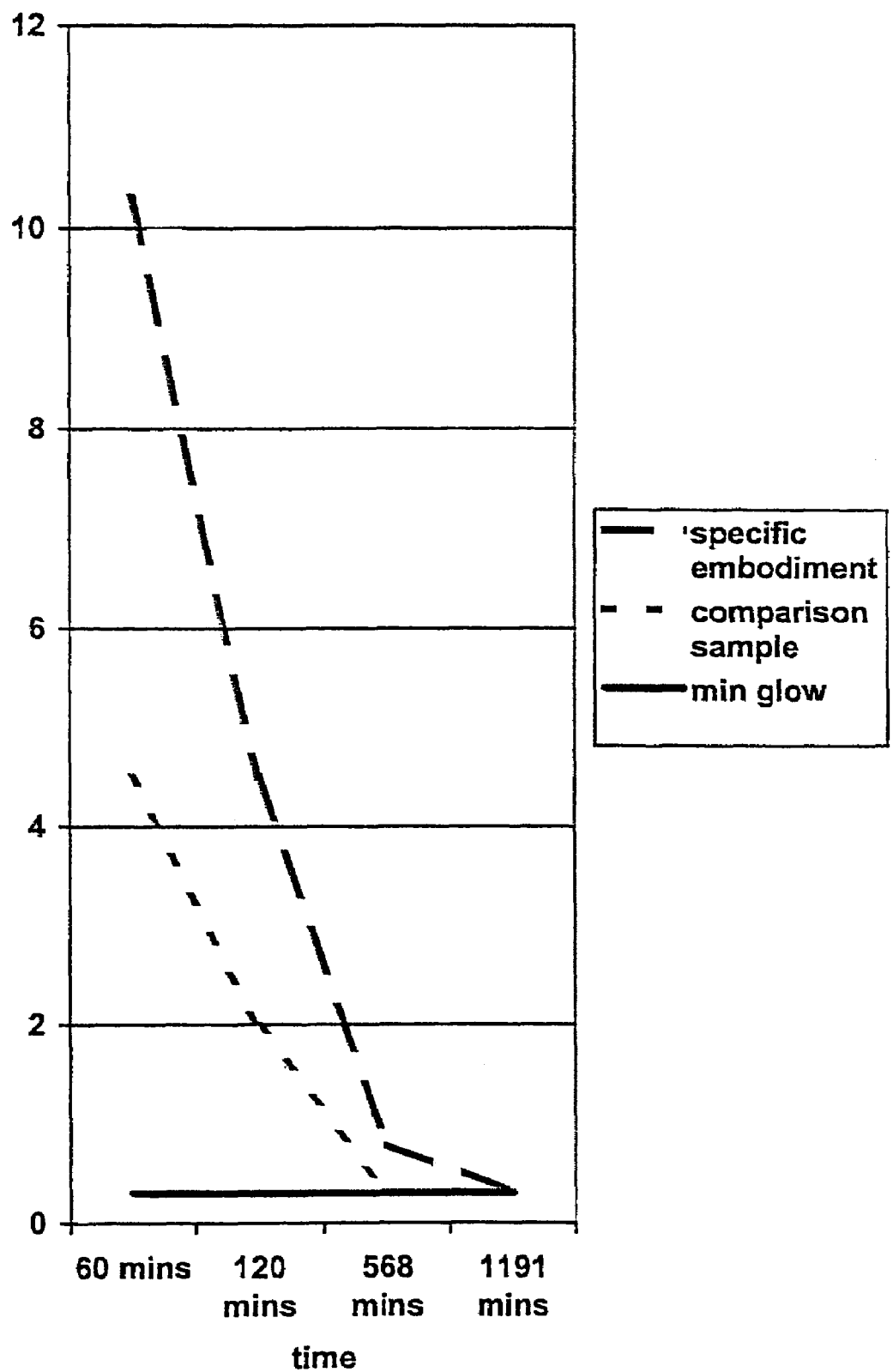
Figure 3A:
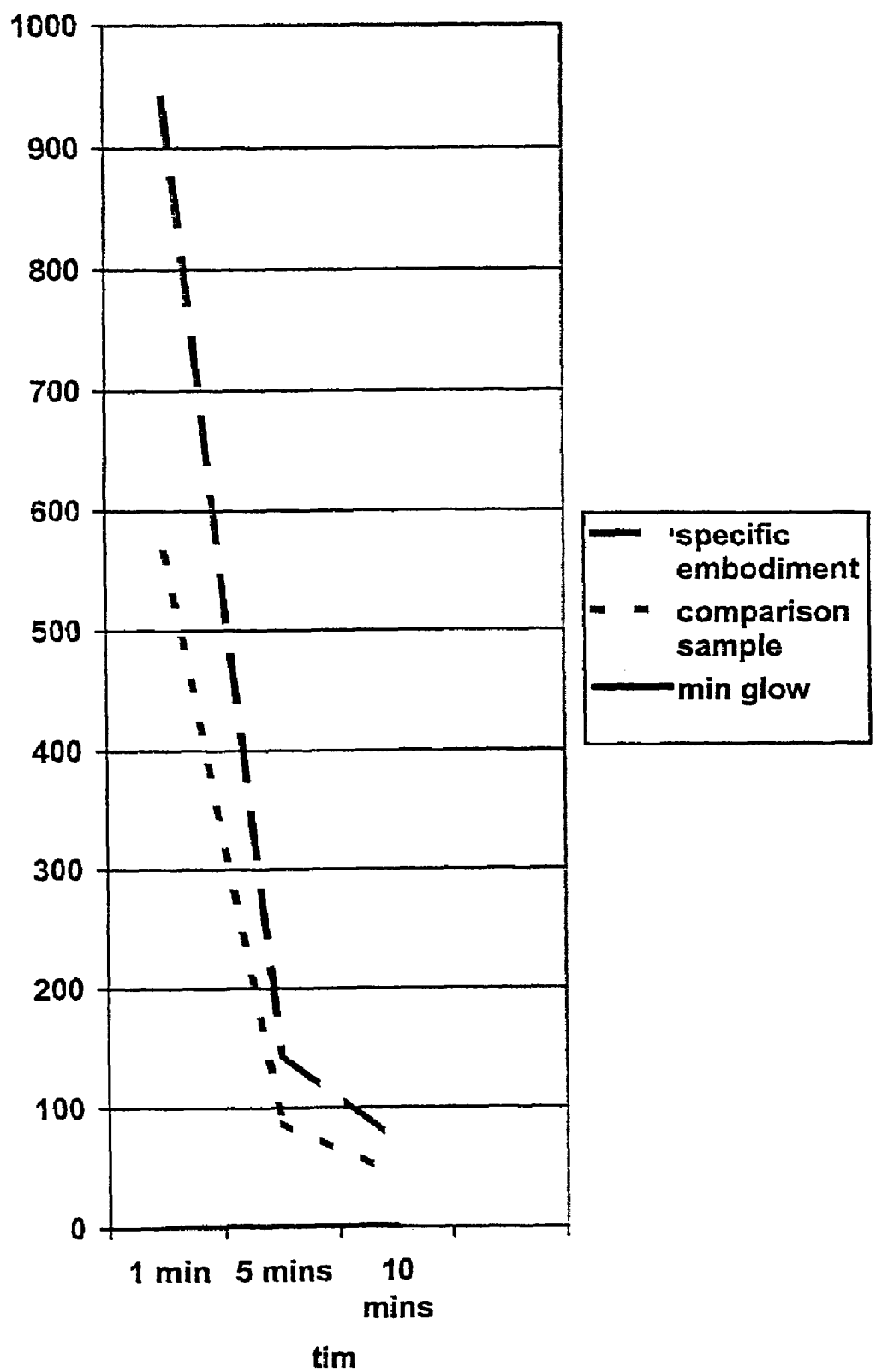

Examples of aspects of the present invention will now be described, with reference to the accompanying drawings, in which:

FIGS. 1(a) and 1(b) show graphs of the glow emission of a sample of luminous material according to the present invention compared with the glow emission of a comparison sample of luminous material coloured with a standard dye at a standard concentration;

FIGS. 2(a) and 2(b) show graphs of the glow emission of a sample of luminous material according to the present invention compared with the glow emission of a comparison sample of luminous material coloured with a standard dye at a reduced concentration; and FIGS. 3(a) and (b) show graphs of the glow emission of a sample of luminous material according to the present invention compared with the glow emission of a sample of luminous material coloured with a fluorescent dye at a standard concentration.

All embodiments of the luminous material comprise a matrix material of rubber, glass or plastics, with dispersed throughout it both a colourant, to give colour to the luminous material, and increase its visibility and aesthetic appeal in daylight, and a luminescent material, to allow it to "glow in the dark". The colourant, and its proportion in the material as a whole, is selected so that its quenching effect on the glow radiated by the luminous material is as low as possible, so that both the daytime visibility and visibility in the dark of the luminous material is enhanced.

The luminescent material can typically be a rare earth metal, or its oxide or aluminate. Europium and dysprosium are suitable. Additionally, alkaline earth metals, their oxides or their aluminates, can be used in conjunction with the rare earth metal, strontium being a suitable example. The luminescent material is particulate in nature, and the particles are between 8 and 100 micrometres in size. The proportion of luminescent material in the luminous material is such that its percentage by weight relative to the weight of the matrix material is between 6% and 32.5%. Ideally, an amount between 6% and 12% is used.

The colourant can be one which imparts an ordinary colour to the luminous material, or it may comprise, in whole or in part, a fluorescent material so that the luminous material is rendered fluorescent. This greatly enhances the properties of the luminous material, because the fluorescence gives increased visibility of the luminous material in low light levels, compared to the visibility of non-fluorescent material. Also, quenching of the glow of the luminous material is reduced, because the colour spectrum of the fluorescent material compared to that of the luminosity is such that absorption of the luminosity within the luminous material is very low. A fluorescent material having a yellow fluorescence spectrum is the most advantageous in this respect, and gives the minimum amount of quenching.

A large number of materials are suitable for use as the matrix. However, a material with high clarity, i.e. a high transparency material, is clearly desirable, to give good transmission of the luminous glow, good fluorescence, and the desired colouring effect of the chosen colourant.

To give luminous materials having plastics material matrices and which are well suited for interior use, suitable candidates for the matrix material are polyurethane, a co-polymer of styrene and butadiene, polyolefins (particularly polypropylene and polyethylene), acrylic, ABS or polyethyleneterephthalate. Polyolefin thermoplastics are preferred, with high density polyethylene being the most advantageous. The thermoplastic has a low concentration of nucleating agents.

With these matrix materials, the percentage by weight of the colourant as compared to the matrix material is between 0.2% and 1%, whereas the luminescent material makes up at least 90% by weight of the combined luminescent material and colourant. Ideally, this latter figure is within the range of 94% to 99%. Additionally, the colourant is an organic pigment, in a polyamide co-condensate carrier, which gives the pigment compatibility with the polyolefin matrix material, owing to the relatively large particle size of the pigment. The co-condensate aids dispersion of the pigment in the matrix material, such that it is dispersed away from the luminescent particles.

Use of polyolefins as the matrix material give materials which provide a greater glow per unit of luminescent material than other embodiments of the present invention described herein. This is achieved partially because of the advantageous molecular structure of polyolefins, which are made up of simple non-complex chains. This structure allows the luminescent material to receive a greater volume of light for absorption, and also gives it a greater ability to re-emit the absorbed light.

A specific example of a luminous material of this type, suitable for interior use and having a high glow level, comprises a matrix of high density polyethylene, a colourant in the form of yellow fluorescent pigment in the amount of 0.3% by weight of the matrix material, and luminescent material in the amount of 6% by weight of the matrix material. However, the amount of fluorescent pigment can be varied between 0.25 and 0.35%, so long as the amount of luminescent material is at least 5%.

If the luminous material is intended for exterior use, it needs to be resistant to the deteriorating effects of weathering, including fading of the colour imparted by the colourant. These characteristics can be achieved if an engineering grade polymer is used as the matrix material. Suitable polymers include acrylic, ABS, polycarbonate or a polyamide such as nylon or a polyamide elastomer. Polyamides are preferred.

In this embodiment, the percentage composition of the luminous material is altered slightly, so that the percentage by weight of the colourant as compared to the polymer matrix is between 0.005% and 0.5%. Furthermore, the luminescent material makes up at least 99% by weight of the combined luminescent material and colourant, with preferably between 99.1% and 99.98% of luminescent material, and ideally, between 99.7% and 99.9%.

The colourants used with engineering grade polymers are of the dye-type, and as before, can be fluorescent, non-fluorescent, or a combination thereof. However, the preferred colorant is a green fluorescent dye with a yellow base colour.

This preferred dye produces a substantially yellow daylight colour; this is an anomaly which occurs because of the presence of the luminescent material in the thermoplastic matrix. Where the luminescent material is in the presence of ultra-violet light, it absorbs, then re-emits stored light as phosphorescence. This phosphorescent light acts to enhance the base colour of the dye, which in this case is yellow. The fact that the phosphorescence enhances and draws out the base colour is best demonstrated by looking at the luminous material under very low ultra-violet light conditions; here it appears substantially greener in colour than in daylight conditions. Furthermore, in dark conditions, the fully charged luminous material appears to glow yellow.

In this embodiment the use of a dye rather than a pigment as the colourant is especially effective. The closer, more complex chains of engineering grade polymers are less capable of separating pigment from the luminescent material. Thus pigment has a greater quenching effect in engineering grade polymers than it does in the polyolefin-based group of luminous material described above, which has the consequence that the daylight colour of the material is substantially greener in colour as well has having inferior glow characteristics. Therefore, dyes, which have more efficient dispersion characteristics in engineering grade polymers, provide a reduced quenching effect compared to that of pigments. At the colourant levels specified in this embodiment, a soluble solid dye is in fact so dispersed that it exists in groups that are as small as 1 to 3 molecules in size. The dye does not bond with the plastic matrix material, but becomes fully dispersed, which is important for optimal absorption and re-emmitance performance of the luminescent material. Furthermore, the nature of the dye is such that it does not attach itself to the luminescent material particles, which provides a similar advantage to that found by the use of pigments in polyolefins; the colorant-free luminescent particles experience an increased the level of light, which may be both absorbed and re-emitted.

The combined effects of the phosphorescence enhancing the base colour of the green dye, the excellent dispersion of the dye within the plastic, and the separation of the dye and luminescent particles, provide an additional beneficial effect. This is that the level of dye that is required to produce an acceptable aesthetic daylight colour in the luminous material may be substantially reduced. Thus, any quenching effects are also substantially reduced. In fact, the recommended level of this type of dye is usually 0.05% by weight in a thermoplastic, but in this embodiment of the present invention satisfactory result have been achieved using between 0.01% and 0.025% concentration, with 0.014% by weight giving the best results.

The presence of the luminescent material also reduces the level of colorant required, owing to its characteristic of acting as an opacifier. This increased opacity further aids the effectiveness of the fluorescent colorant. This reduction in the required amount of dye is advantageous in that it reduces the level of quenching of the luminous effect by at least 40%.

A specific example of a luminous material of this type, suitable for exterior use and requiring a reduced amount of colourant, comprises a matrix of polyamide, a colourant in the form of green fluorescent dye with a yellow base colour in the amount of 0.014% by weight of the matrix material, and luminescent material in the amount of 8% by weight of the matrix material.

Figure 3B:
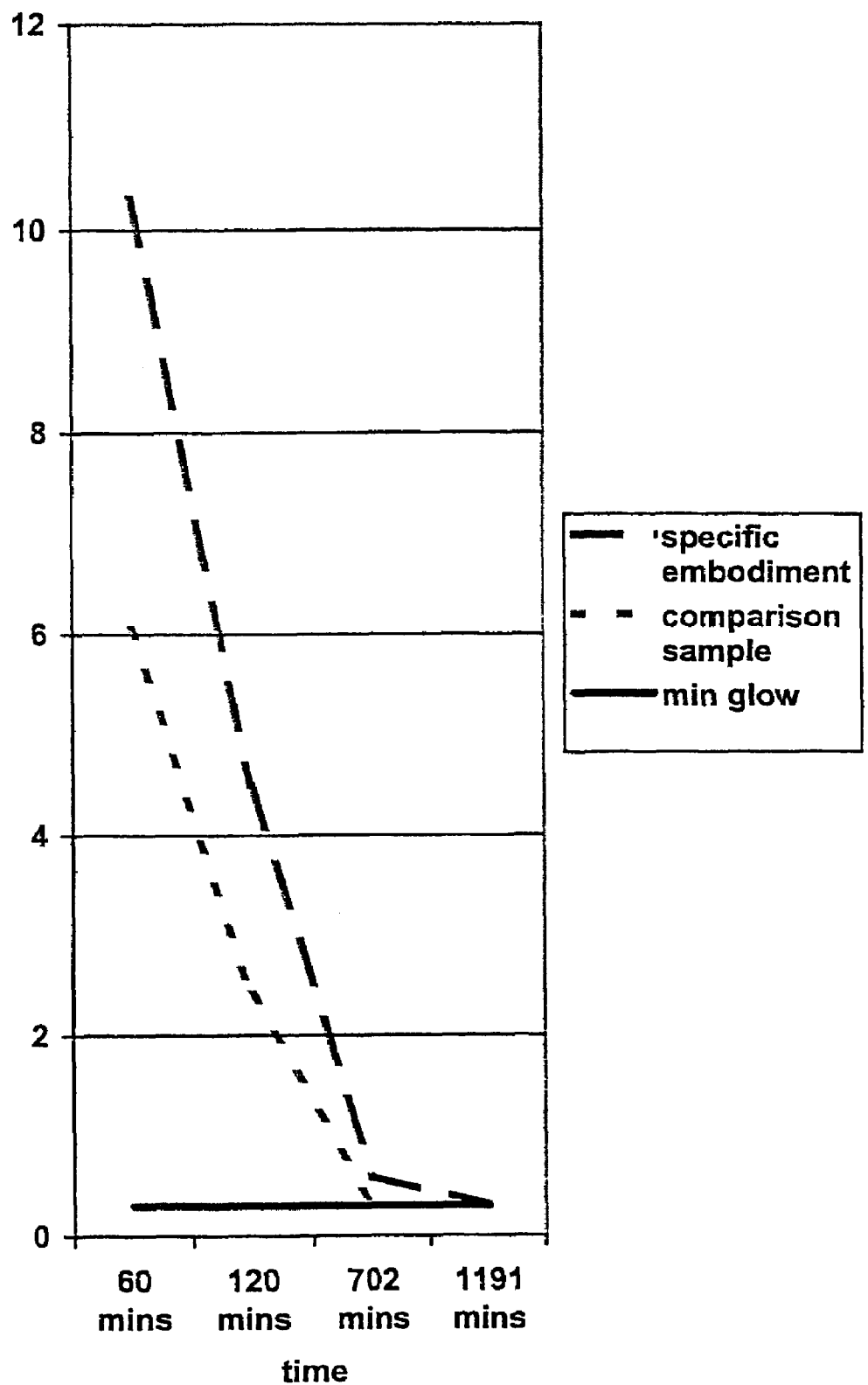

FIGS. 1, 2 and 3 show graphs of the time decay of luminous glow emissions, in mini-candelas per square metre, of test samples of luminous material according to the present invention coloured with green fluorescent dye with a yellow base colour, compared with that of samples of other luminous materials. Each (b) graph follows on in time from its corresponding (a) graph, with the glow axes expanded to show more detail. In all cases, the results were obtained from tests conducted in accordance with DIN 67510. All samples, both the embodiment of the invention and the comparison samples, were moulded plaques of 2 mm thickness, made from a polyamide matrix and a master batch carrier carrying luminescent material and colorant, the carrier being present in the matrix material at a proportion of 60% by weight of the matrix material.

In each case, the colourant used to colour the specific embodiment samples was a green fluorescent dye having a yellow base colour, which was added to the polyamide matrix material at a level of 0.014% by weight of the polyamide.

FIG. 1 shows the specific embodiment sample compared with a sample in which the colourant used was a yellow solvent soluble dyestuff of the type solvent yellow 93 Kenawax yellow 2GNP, typically used for the colouring of thermoplastics such as polyamide. This was added to the polyamide at 0.05% by weight, this amount being close to the recommended concentration for the dyeing of thermoplastics of 0.07%. As can be seen from the graphs of FIG. 1, the specific embodiment is of the order of 2.8 times more effective at emitting glow than the comparison sample, showing that use of the yellow fluorescent dye gives a better luminous material than one coloured with a regular dye used at standard recommended concentrations.

FIG. 2 shows the specific embodiment sample compared with a sample in which the colourant used was again the yellow solvent soluble dyestuff of the type solvent yellow 93 Kenawax yellow 2GNP. In this case, the dye was added to the comparison sample polyamide at 0.014% by weight, this concentration being the same as the concentration of fluorescent dye used in the specific embodiment sample. As can be seen from the graphs of FIG. 2, the specific embodiment is of the order of 2 times more effective at emitting glow than the comparison sample, showing that use of the yellow fluorescent dye gives a better luminous material than one coloured with a regular dye used at the same concentration. Moreover, the yellow colour in daylight of the specific embodiment sample is a brighter hue than that of the comparison sample, and was also judged to be more aesthetically pleasing.

FIG. 3 shows the specific embodiment sample compared with a sample in which the colourant used was the same green fluorescent dye with a yellow base as that used in the specific embodiment sample. However, the dye was added to the comparison sample polyamide at 0.05% by weight, this concentration being typical of recommended concentrations for dyeing thermoplastics with the dye. As can be seen from the graphs of FIG. 3, the specific embodiment is of the order of 1.6 times more effective at emitting glow than the comparison sample, showing that use of the fluorescent dye at a reduced concentration gives a better luminous material than one coloured with the same dye used at the recommended concentration.

A further embodiment, also using engineering grade polymers as the matrix material, is a white luminous material created by using only white colourants. This produces a material which is extremely versatile, in that it matches many existing fixtures and fittings popularly made from white plastics. Appropriate polymers included polyurethane, co-polymers of styrene and butadiene, polyolefins, acrylic, ABS, polyethyleneterephthalate, polycarbons, PC-ABS alloys, polyethylene butyl tersthylene, modified polypropylene, PET, and most preferably, polyamides. As before, a high clarity matrix material is desirable.

Appropriate white colourants include titanium dioxide, calcium carbonate, silicon dioxide, and other translucent white colourants. These colourants are pigments, and may be used in combination, and titanium dioxide and silicon dioxide work particularly well together in this respect.

Proportions of the various components in a white luminous material are such that the percentage by weight of the white colourant to the matrix material is between 0.33% and 3%, and that of the luminescent material to the total of the luminescent material and the colourant is at least 97%, and preferably between 98.2% and 99.67%.

A specific example of a white luminous material based on titanium dioxide as a fluorescent colourant has the composition of a polyamide matrix, a luminescent material, and titanium dioxide at the level of 0.495% by weight to the matrix, and a level of 5.5% by weight to the luminescent material. The amount of titanium dioxide can be varied, however, between 0.35 and 0.65%.

The titanium dioxide provides a desirable white daylight colour. The preferred particle size of the pigment is less than 1 micron, which enhances performance of the luminescent material, as smaller particle sizes have greater dispersion within the matrix. The titanium dioxide is particularly preferred due to the whiteness of the light that it reflects, which is such that part of it lies in the excitation spectrum of the luminescent material. Thus the titanium dioxide is effective in aiding the charging process of the luminescent material and consequently provides a reduced quenching effect.

Engineering grade polymers can be provided with approximately 1 to 3% by weight of titanium dioxide in order to obtain a satisfactory white daylight colour. At this level of pigmentation the quenching effect is at least twice and up to four times higher than that of the above specific example, whilst in the specific example the daylight colour is still substantially white despite the reduced amount of colourant.

An increase in the whiteness of the luminescent material is further aided by the opacity increase that is provided by the presence of the luminescent material. Hence less white pigment is required to produce a material with a substantially white daylight colour.

A specific example of a white luminous material based on silicon dioxide as a colourant has the composition of a polyamide matrix, a luminescent material, and silicon dioxide at the level of 1.08% by weight to the matrix, and a level of 12% by weight to the luminescent material. The amount of silicon dioxide can be varied, however, between 0.7 and 1.5%.

A material with this composition provides less integral strength than one in which titanium dioxide is used, but is advantageous in that, as a colourant, it is a partially translucent. The characteristic of translucency is such that the quenching effect is reduced, because more ultra-violet light is able to reach the luminescent material. Silicon dioxide is also advantageous because of the size of its particles, which range between 0.02 and 0.14 nm, which gives the colourant greater dispersion within the plastic. This increase in dispersion aids the reduction in quenching.

Each of the above embodiments, namely, the interior material, the exterior material and the white material, can be enhanced by the addition of optical brighteners. These can be added to the luminescent material and/or the colourant before these are added to the matrix material, or can be added directly to the matrix material along with the luminescent material and the colourant. The brightener makes the material appear brighter in daylight and in the dark, so that its visibility is improved at all times.

A specific embodiment of a white luminous material provided with optical brighteners is one comprising a polyamide matrix, luminescent material, titanium dioxide in the amount of 0.36% by weight of the matrix and 4% by weight of the luminescent material, and a blue fluorescent dye optical brightener in the amount of 0.04% by weight of the matrix. Alternatively, the titanium oxide amount can be varied between 0.15 and 0.5% m and the dye amount can be varied between 0.02 and 0.065%.

Fluorescent blue dye is especially advantageous as an optical brightener because it converts ultra-violet light into blue fluorescent light. The blue fluorescent light has two beneficial features, firstly, that it tricks the eye into believing that something is in fact whiter than it actually is, which allows a reduction in the level of titanium dioxide used and consequently reduces the quenching, and secondly, that its wavelength range is from 540 to 560 nm which enables it to excite the luminescent material, so that there is a greatly reduced quenching effect per unit of daylight colour change in the luminous material.

Suitable matrix materials are not limited to those previously mentioned; these are merely particularly suitable for those particular embodiments. Other materials which can be used include polystyrene, and thermoset moulding materials such as phenolics, ureas, melamines, nylon 6 and nylon 66. Natural and synthetic rubbers are also suitable.

The luminous materials described herein can be readily made by a simple process. A two-step process can be used, as follows:

a) a colourant is compounded into a rubber, glass or plastics material; and b) a luminescent material including at least one alkaline earth metal and at least one rare earth metal is compounded into the matrix material.

Alternatively, these steps can be reversed, so that the luminescent material is compounded into the matrix material first, followed by the colourant.

It is possible to further simplify the process by combining the two steps, so that the colourant and the luminescent material are added to the matrix material together, and the whole blended together to produce the luminous material.

To improve the integrity of the luminous material, the above processes should be carried out using machinery which is specifically adapted to reduce shearing of the material.

With further regard to the manufacture of these luminous materials, it is possible to create colourant combinations, comprising a colourant and a luminescent material together, which can be added to a suitable matrix material in a one-stage manufacturing process to produce the material. In this way, colourant combinations can be supplied to plastics manufacturers, for example, who can then readily produce luminous materials by adding it to materials with which they may already work.

A colourant combination of this type can be prepared in a universal masterbatch carrier, which acts to produce an adequate level of dispersion of the colourant and luminescent material throughout the matrix material so that the finished luminous material has an even strength, structure and appearance, and a better rate of light absorption and re-emission. A further function of the carrier is to reduce the damage caused to plastics moulding machines used to form products from the luminous materials, which can be caused by the hard and sharp crystals which make up the luminescent materials. Ethylene-based carrier materials are suitable, such as polyethylene methacrylate or polyethylene vinyl acetate. The colourant combination is prepared in the carrier at the proportion of up to 65% by weight.

To increase the quality of the colourant combination by reducing its shear, and hence giving improved integrity to the final luminous material, the preparation of the combination can be carried out using machinery fitted with a low shear screw. Also to this end, the luminescent material and the colourant should be added to the carrier when this latter is substantially heated or melted.

A number of colourant combinations suitable for use in the specific examples of luminous materials set out above will now be described:

a combination of fluorescent yellow pigment colourant and luminescent material in a polyethylene methacrylate carrier, the colourant and luminescent material present in the carrier at a level of 60% by weight. Such a carrier combination should be added to a high density polyethylene matrix in the amount of 8 to 12% by weight, and preferably 10%, to produce a polyethylene-based, high glow, interior use luminous material;

a colourant of green fluorescent dye with a yellow base colour and luminescent material in a carrier of polyethylene methacrylate, the colourant being provided at 0.166% by weight of the luminescent material, and the colourant and luminescent material together being provided in the carrier at 60% by weight. This carrier combination can be added to a polyamide matrix at a level between 12 and 18%, preferably 15%, to produce a luminous material of the exterior use embodiment;

a titanium dioxide colourant and luminescent material in a polyethylene methacrylate carrier, the colourant being provided at 5.5% by weight of the luminescent material, and the colourant and the luminescent material together being provided in the carrier at 60% by weight. This carrier combination can be added to a polyamide matrix at a level of 15% by weight to produce a white, titanium dioxide-based luminous material.

a silicon dioxide colourant and luminescent material provided in a carrier at a ratio of 12% and 88% respectively, together being present in the carrier at the level of 60% be weight. This carrier can be added to a polyamide matrix at a level of 15% by weight to produce a white, silicon dioxide-based luminous material.

a titanium dioxide colourant, luminescent material and fluorescent blue dye in the ratio of 4%, 95.5% and 0.45% respectively, together present in a carrier at a level of 60% be weight. This carrier combination can be added to a polyamide matrix to produce a white luminous material based on titanium dioxide and being provided with optical brighteners.

Under the BSI hot wire test for thermoplastic suitability in the electrical plugs:

Where the colorant combination is used at 30% concentration this has the effect of increasing fire retardency by 4% by comparison to a sample of the natural thermoplastic.

Where the colorant combination is compounded into the polymer at 20% this has the effect of increasing fire retardency by at least 7% by comparison to a sample of the natural thermoplastic.

Where the colorant combination is compounded into the polymer at 30% this has the effect of increasing fire retardency by at least 9% by comparison to a sample of the natural thermoplastic.

In all the above examples a 2 mm thick sample of Polycarbonate, ABS, Polycarbonate-ABS alloy, Polyamide Nylon 6, passed the electrical standards hot wire test (that is used for BSI approved electrical plugs) for flammability.

All of the luminous materials described herein can be easily made into a large range of articles. Being based on plastic, rubber or glass matrices, the materials can be formed into articles by moulding or extruding, and are thus suited to the mass manufacture of articles.

If appropriate, an article can be further improved by adding to it a reflective layer. This can be done if the article has a reverse side or an inner side away from the part of the article required to be luminous and visible. The reflective layer increases the visibility of the article in daylight and in the dark, by reflecting light towards an observer. The reflective layer can be white, and is of a different material to the luminous material of the article itself, and selected for its reflective properties rather than its visibility or its luminous properties.

A particularly useful article which can be made from the luminous material is adhesive tape, film or layer. This allows the high daylight visibility and high luminosity characteristics of the luminous material to be readily and simply added to an existing article, by sticking tape or film to it as necessary. The user can thereby improve an existing article precisely as desired. In the production of such tape, the luminescent material should preferably constitute not more than 65% by weight of the total of the luminescent material, the colourant and the matrix material used to make the tape.

A further article which is advantageously made from the luminous material according to the present invention is a switch. Luminous switches are already known, made from the known thermoplastic materials mentioned at the beginning of this text. However, they have not been widely adopted owing to the undesirable appearance of these plastics. Switches which are visible in the dark are, however, most useful. For example, it is very useful to be able to see a switch which controls an electric light when that light is off and the room is in darkness, such as at night, or in the event of a power failure. A previously proposed solution which seeks to overcome the disadvantageous appearance of known luminous plastics incorporates a small, additional and separate light emitting device into a switch, so that light is emitted in the dark. However, this solution consumes energy to power the additional light source, and also fails when the light emitting device breaks or reaches the end of its life.

A switch made from the luminous material of the present invention seeks to overcome these problems, by providing a switch which gives an afterglow in the dark and has an acceptable appearance in daylight conditions.

Many switches can be advantageously made from the luminous material of the present invention. Besides the aforementioned light switch, a switch for use on a computer keyboard is contemplated, as are a one-way switch, a two-way switch, a multiple-way switch, a high current/voltage switch, a push-button switch, a lever, dials for switching, a sliding switches, a toggle switch, variable effect switches, and variable resistance switches.

Particularly in the case of a light switch, a white colourant can be used to produce a white-coloured switch. A large number of light switches are currently produced in white plastics, so a white plastic switch with luminous properties will be acceptable to consumers.

The luminous glow of a switch according to the present invention can be improved by providing the switch with a light source, such as a light emitting diode. The light from this will further charge the luminous material, in addition to the charging it receives from exposure to daylight and other ambient light, so that when the switch is in the dark, the luminous glow is brighter and more long-lasting than would be the case without the light source.

Luminous switches also have applications on under-water equipment. Visibility under water is typically rather poor, so switches which combine high daylight visibility, by being a bright colour or white, with luminosity and possibly fluorescence, are very useful.

Additionally, a luminous switch can be provided which is resistant to fire. Fire retardancy can be provided in many ways. These include coating the switch with a fire-retardant lacquer having a high clarity so that the visibility function of the switch is not impaired, incorporating a fire-retardant additive into the matrix material of the luminous material from which the switch is made, providing an outer layer of high clarity fire retardant material during injection moulding of a switch, or using high melting point plastics as the matrix material of the luminous material.

Alternatively, parts of switches can be made from the luminous material. These parts include, for example, the knob at the end of a pull-cord switch. Also, parts can be provided which are designed to be fitted to pre-existing switches to give those switches the characteristics of the luminous material.

Switches can also be made high-visibility and luminous by coating them, or parts of them, with the luminous material during manufacture. Alternatively, adhesive tape or film made from the luminous material can be applied to a switch.

The invention claimed is:

1. A luminous material comprising a rubber, glass or plastics material matrix, a rare earth metal luminescent material dispersed throughout the matrix and titanium dioxide with a particle size of less than one micron dispersed throughout the matrix as a colourant, the colourant allowing substantial transmission of light emitted by the luminous material.

2. A luminous material according to claim 1, in which the luminescent material comprises a rare earth metal which is selected from one of europium or dysprosium.

3. A luminous material according to claim 1, in which the luminescent material is in the form of a metal oxide or an aluminate.

4. A luminous material according to claim 1, in which the luminescent material further comprises an alkaline earth metal which is strontium.

5. A luminous material according to claim 1, in which the luminescent material comprises particles having dimensions between 8 and 100 micrometers.

6. A luminous material according to claim 1, in which the percentage by weight of the luminescent material to the matrix is between 4% and 32.5%.

7. A luminous material according to claim 6, in which the percentage by weight of the luminescent material is between 4% and 20%.

8. A luminous material according to claim 6, in which the percentage by weight of the luminescent material is between 6% and 12%.

9. A luminous material according to claim 1, in which the matrix material is polyurethane, a co-polymer of styrene and butadiene, a polyolefin which comprises a selected one of polypropylene or polyethylene, acrylic, ABS, polyethyleneterephthalate or polycarbonate.

10. A luminous material according to claim 1 in which the luminescent material constitutes at least 90% by weight of the combined weight of the luminescent material and the colourant.

11. A luminous material according to claim 10, in which luminescent material constitutes between 94% and 99% by weight of the combined weight of the luminescent material and the colourant.

12. A luminous material according to claim 10, in which luminescent material constitutes between 94 to 96% thereof by weight of the combined weight of luminescent material and the colourant.

13. A luminous material according to claim 1, in which the percentage by weight of the colourant to the matrix material is between 0.2% and 1%.

14. A luminous material according to claim 1, in which the material matrix is an engineering grade polymer.

15. A luminous material according to claim 14, in which the polymer is one of acrylic, ABS, polycarbonate or a polyamide such as nylon or a polyamide elastomer.

16. A luminous material according to claim 1, in which the percentage by weight of the luminescent material to the combined weight of the luminescent material and the colourant is at least 99%.

17. A luminous material according to claim 16, in which the percentage by weight of the luminescent material to the combined weight of the luminescent material and the colourant is between 99.1% and 99.98%.

18. A luminous material according to claim 16, in which the percentage by weight of the luminescent material to the combined weight of the luminescent material and the colourant is between 99.7% and 99.9%.

19. A luminous material according to claim 14, in which the percentage by weight of the colourant to the engineering grade polymer matrix is between 0.005% and 0.05%.

20. A luminous material according to claim 1, in which the percentage by weight of the luminescent material to the combined weight of the luminescent material and the colourant is at least 97%.

21. A luminous material according to claim 20, in which the percentage by weight of the luminescent material to the combined weight of the luminescent material and the colourant is between 98.2% and 99.67%.

22. A luminous material according to claim 1, in which the percentage by weight of the colourant to the matrix material is between 0.3 3% and 3%.

23. A luminous material according to claim 1, in which the matrix material used with the colourant is of a high clarity and is one of polyurethane, a co- polymer of styrene and butadiene, a polyolefin, ABS or a polyamide.

24. A luminous material according to claim 1, in which the colourant additionally comprises silicon dioxide.

25. A luminous material according to claim 1, in which the luminous material further comprises an optical brightener dispersed in the matrix such that both the visibility of the material in daylight, and the visibility in the dark, via the luminescence, is enhanced.

26. A luminous material according to claim 25, in which the optical brightener is a fluorescent blue dye.

27. A luminous material according to claim 1, in which the matrix material has a high clarity.

28. A luminous material according to claim 1, in which the opacity of the matrix is increased with the addition of the colourant and luminescent material.

29. A method for making a luminous material, comprising the steps of a) providing a rubber, glass or plastics matrix material; b) compounding a titanium dioxide colourant having a particle size of less than one micron into the matrix material; and c) compounding a rare earth metal luminescent material into the matrix material, the luminescent material including at least one alkaline earth metal and at least one rare earth metal; wherein the colourant provides the matrix material with a substantially white color when it is observed under substantially white light and wherein the opacity of the matrix is increased with the compounding of such colourant and luminescent material.

30. A method according to claim 29, in which step b and step c are performed sequentially such that one of the steps is performed before the other.

31. A method according to claim 29, in which the compounding steps of b and c are combined into a single blending step.

32. A method according to claim 29, in which the making of the luminous material is carried out using machinery adapted to reduce shearing of the material.

33. A colourant combination comprising a colourant and a luminescent material, the colourant combination being suitable for adding to a rubber, glass or plastics material matrix for the creation of a luminous material according to claim 1.

34. A colourant combination according to claim 33, in which the colourant combination is prepared in a universal masterbatch carrier, which is advantageously ethylene-based and made of selected one of polyethylene methacrylate or polyethylene vinyl acetate.

35. A colourant combination according to claim 34, in which the colourant combination is prepared in the carrier at a concentration of up to about 65% by weight of the matrix material.

36. A colourant combination according to claim 33, in which the colourant combination is prepared in a machine fitted with a low shear screw.

37. A colourant combination according to claim 33, in which the colourant combination is prepared by adding the luminescent material and the colourant to the carrier when the carrier is substantially heated or melted.

38. A colourant combination according to claim 33, in which the colorant combination further comprises optical brighteners.

39. A non-luminous article provided with a coating, or outer layer, of luminous material according to claim 1.

40. An article comprising the luminous material according to claim 1.

41. An article according to claim 40, in which the article is made by moulding the luminous material.

42. An article according to claim 41 in which the moulding is formed by injection or co-injection.

43. An article according to claim 40, in which the article is made by extruding the luminous material.

44. An article according to claim 40, in which the article is a switch that actuates an electrical connection to a conductive element that is associated with and separate from the switch.

45. An article according to claim 44, in which the switch is suitable for use in controlling a selected one of an electric light or a computer keyboard.

46. An article according to claim 44, in which the switch actuates an electrical light emitting device, which is controlled by the switch, such that light is emitted when the switch is in the on position.

47. An article according to claim 44, in which the switch is water-proof

48. An article according to claim 44, in which the switch is retarded against fire.

49. An article according to claim 40, in which the article is a flashlight casing, or part therefor, which is a rubber or plastics moulding.

50. An article according to claim 49, in which the moulding for the casing or part therefor is shaped from a matrix comprising a rubber or plastics material which is selected from one of a thermoplastic or a thermoset with colorant materials dispersed therein.

51. An article according to claim 40, in which the article is an electrical plug which is retarded against fire.

52. An article comprising the luminous material of claim 1 the article including a reverse or inner side and a substantially reflective layer on its reverse or inner side.

53. The article of claim 52, in which the reflective layer is white.

54. An article comprising the luminous material of claim 1 the article including a layer applied thereto containing reflective glass beads.

55. An adhesive tape, film or layer comprising the luminous material of claim 1.

56. The adhesive tape, film or layer of claim 55, in which the luminescent material constitutes not more than 65% by weight of the total of the luminescent material, the colourant and the matrix material used to make the tape.

* * * * *